United States Patent
Takaiwa (10) Patent No.: US 7,687,179 B2
(45) Date of Patent: Mar. 30, 2010

(54) FUEL CELL DEVICE WITH AIR FILTER

(75) Inventor: Yuji Takaiwa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/369,591

(22) Filed: Feb. 11, 2009

(65) Prior Publication Data

US 2010/0015500 A1   Jan. 21, 2010

(30) Foreign Application Priority Data

Jul. 18, 2008   (JP) .............. 2008-187385

(51) Int. Cl.
*H01M 2/00*   (2006.01)
*B01D 46/04*   (2006.01)

(52) U.S. Cl. .......................... 429/34; 55/304
(58) Field of Classification Search ............. 429/12–46; 55/304, 300
See application file for complete search history.

(56) References Cited

U.S. PATENT DOCUMENTS

| | | | | |
|---|---|---|---|---|
| 6,638,329 B2 * | 10/2003 | Gerold | ..................... | 55/295 |
| 2006/0292420 A1 * | 12/2006 | Goto et al. | ..................... | 429/34 |

2007/0224472 A1   9/2007   Fujita et al.

FOREIGN PATENT DOCUMENTS

| | | |
|---|---|---|
| JP | 61-29416 | 8/1986 |
| JP | 03-012686 | 1/1991 |
| JP | 2001-185193 | 7/2001 |
| JP | 2006-043085 | 6/2006 |
| JP | 2007-077963 | 3/2007 |
| JP | 2007-188640 | 7/2007 |
| JP | 2007-265695 | 10/2007 |
| WO | 2005-074065 A1 | 1/2005 |
| WO | 2005-074065 A1 | 8/2005 |

\* cited by examiner

*Primary Examiner*—Keith Walker
(74) *Attorney, Agent, or Firm*—Blakely, Sokoloff, Taylor & Zafman LLP (57) ABSTRACT

According to one embodiment, a fuel cell device includes a main body, an electricity generator, a fuel cartridge, an air inlet, an air intake filter, and a vibration applying mechanism. The electricity generator is housed in the main body, and generates electricity. The fuel cartridge is detachably housed in the main body, and supplies the electricity generator with fuel for electricity generation. The air inlet draws air in from atmosphere to supply the electricity generator with the air. The air intake filter covers the air inlet and cleans air. The vibration applying mechanism causes the air intake filter to vibrate in response to the movement of the fuel cartridge with respect to the main body.

2 Claims, 6 Drawing Sheets

FUEL CELL DEVICE WITH AIR FILTER

CROSS REFERENCE TO RELATED APPLICATIONS

This application is based upon and claims the benefit of priority from Japanese Patent Application No. 2008-187385, filed Jul. 18, 2008, the entire contents of which are incorporated herein by reference.

BACKGROUND

1. Field

One embodiment of the invention relates to a fuel cell device.

2. Description of the Related Art

Nowadays, secondary batteries such as lithium ion batteries have been commonly used as a power supply for electronic devices such as portable notebook computers and mobile devices.

Recent improvement in the performance of such electronic devices increases their power consumption and creates the demand to prolong their use time. In view of this, fuel cells with high output that do not need recharging and are small in size are expected as a new power supply. Among the fuel cells is a direct methanol fuel cell (DMFC) which uses an aqueous methanol solution circulated therein. Methanol as a fuel in the DMFC is easy to handle compared to hydrogen used as a fuel for other types of fuel cells. Further, the DMFC has a simple structure, and thus has attracted attention as a power supply for electronic devices.

A conventional DMFC includes a DMFC stack having a fuel electrode, an air electrode and an electrolyte membrane, a fuel supply path for supplying an aqueous methanol solution to the fuel electrode, and an air supply path for supplying air to the air electrode. The air supply path is provided with an air inlet for drawing in air from the surrounding atmosphere.

On the fuel electrode of the DMFC stack, methanol reacts with water and is oxidized, which generates hydrogen ions, carbon dioxide, and electrons. The hydrogen ions pass through the electrolyte membrane and reach the air electrode. On the air electrode, oxygen in the air combines with the hydrogen ions and the electrons, and thus is reduced to water. At this time, current flows through an external circuit connected between the fuel electrode and the air electrode, and electricity is generated.

If the air supplied to the DMFC stack contains, for example, hydrocarbon compounds, the compounds adhere to the air electrode. This poses an obstacle to the reduction reaction on the air electrode. Since a decrease in the reduction reaction lowers the electricity generation performance of the DMFC, hydrocarbon compounds need to be removed from the air when the DMFC takes in oxygen for the reduction reaction from the air.

For example, Japanese Patent Application Publication (KOKAI) Nos. 2001-185193 and 2007-188640 each disclose a conventional DMFC including an air intake filter. The air intake filter is arranged on the air supply path extending from the air inlet to the air electrode, and cleans air drawn in through the air inlet. That is, the air intake filter has a function of absorbing hydrocarbon compounds.

To maintain the original electricity generation performance of the DMFC, the cleaning performance of the air intake filter needs to be maintained at a high level. Therefore, it is desirable that the air intake filter be replaced frequently to prevent its cleaning performance from degrading.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a fuel cell device comprises: a main body; an electricity generator housed in the main body, the electricity generator configured to generate electricity; a fuel cartridge configured to be detachably housed in the main body, and supply the electricity generator with fuel for electricity generation; an air inlet configured to draw air in from atmosphere to supply the electricity generator with the air; an air intake filter configured to cover the air inlet and clean air; and a vibration applying mechanism configured to cause the air intake filter to vibrate in response to movement of the fuel cartridge with respect to the main body.

Figure 1:
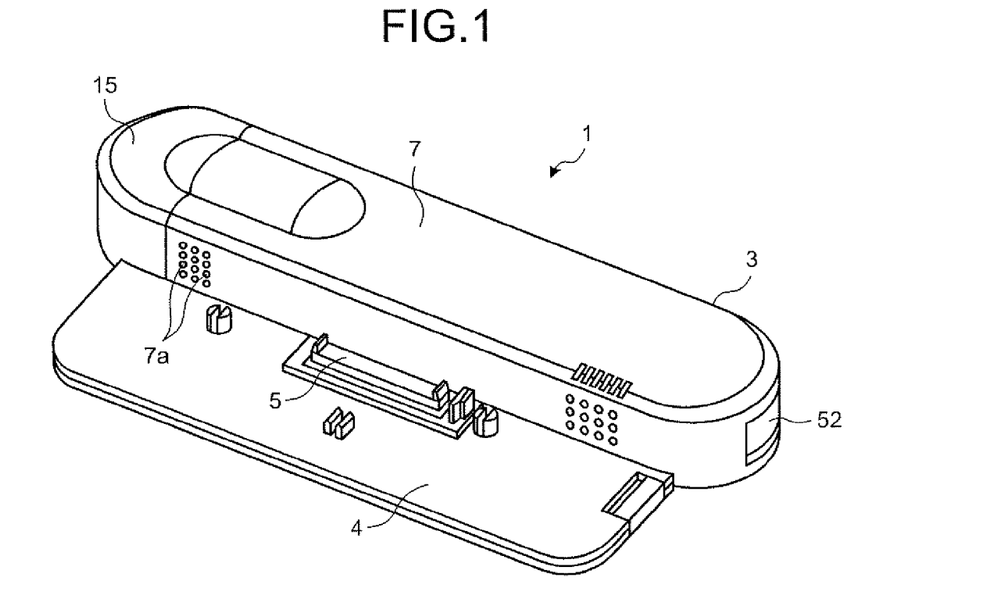
FIG. 1 is an exemplary perspective view of a fuel cell device according to a first embodiment of the invention.
Figure 2:
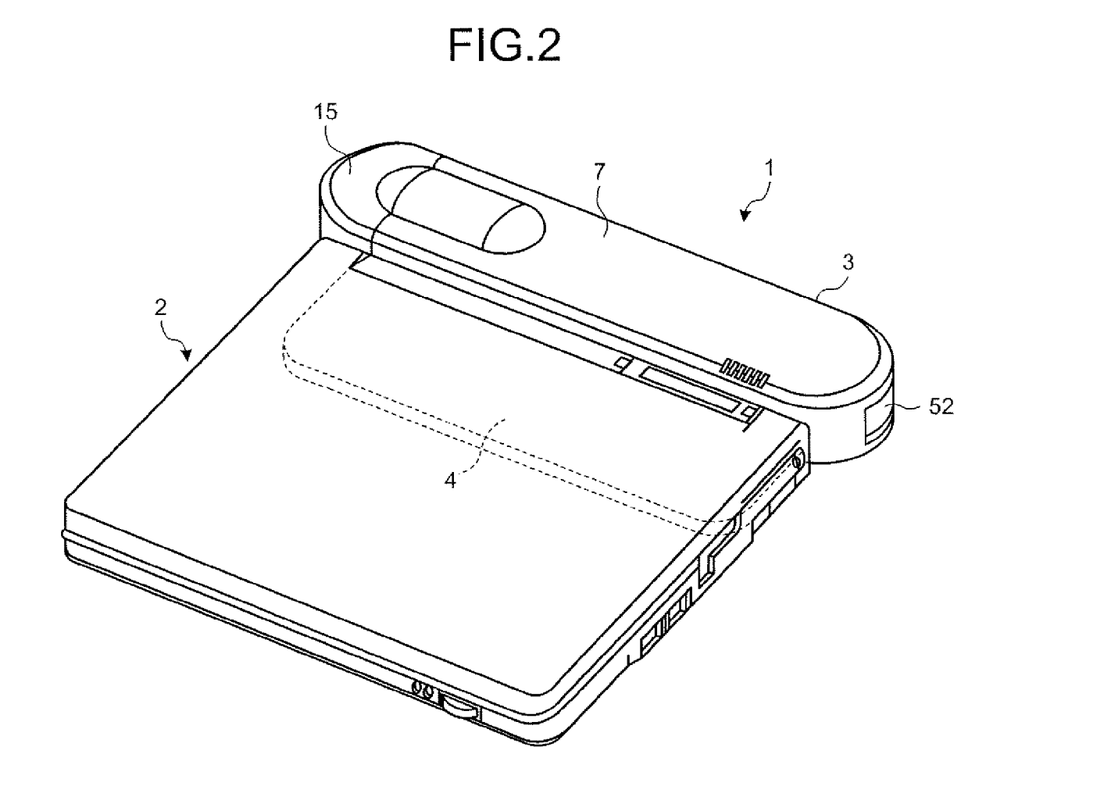
FIG. 2 is an exemplary perspective view of the fuel cell device and a portable computer connected thereto in the embodiment.
Figure 3:
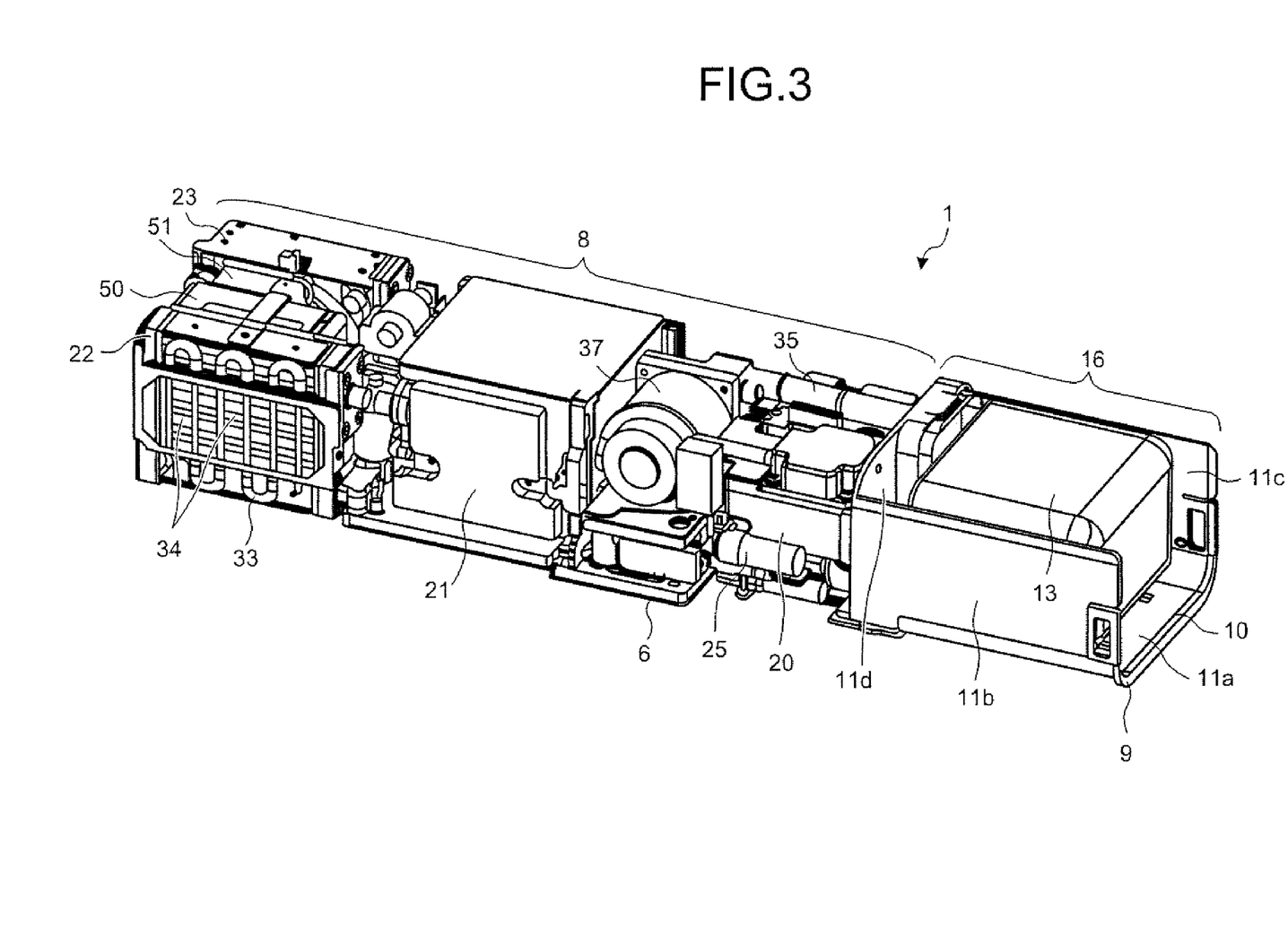
FIG. 3 is an exemplary perspective view of the internal configuration of the fuel cell device in the embodiment.

With reference to FIGS. 1 to 7, a description will be given of a fuel cell device according to a first embodiment of the invention. FIG. 1 is a perspective view of a fuel cell device 1 according to the first embodiment. FIG. 2 is a perspective view of the fuel cell device 1 and a portable computer 2 connected thereto. FIG. 3 is a perspective view of the internal configuration of the fuel cell device 1. The fuel cell device 1 illustrated in FIGS. 1 to 3 comprises a direct methanol fuel cell (DMFC) which uses an aqueous methanol solution circulated therein. As illustrated in FIG. 2, the fuel cell device 1 is of such a size that it is available as the power supply of the portable computer 2.

As illustrated in FIGS. 1 and 2, the fuel cell device 1 comprises a main body 3 and a support member 4. The main body 3 has an elongated box-like shape extending along the width direction of the portable computer 2. The support member 4 extends horizontally from the front edge of the main body 3 such that it can support the rear portion of the portable computer 2. Arranged on the support member 4 is a power-supply connector 5. The power-supply connector 5 is electrically connected to the portable computer 2 when the portable computer 2 is mounted on the support member 4.

The main body 3 comprises a base 6 (see FIG. 3) and a top cover 7 that covers the base 6. The base 6 and the top cover 7 define, in combination, a hollow closed space 8. The closed space 8 is a section that is basically not accessible to a user of the fuel cell device 1, and occupies the most part of the main body 3.

The base 6 comprises a holder support member 9. The holder support member 9 is located at one end of the main body 3 in the longitudinal direction thereof. The holder support member 9 extends outside of the closed space 8 without being covered by the top cover 7. On the holder support member 9 is attached a holder 10. The holder 10 comprises a bottom wall 11a, a pair of side walls 11b and 11c, and a partition wall lid. The bottom wall 11a is located on the holder support member 9. The side walls 11b and 11c face each other and are spaced apart in the width direction of the main body 3. The partition wall 11d stands on the bottom wall 11a such that it partitions between the closed space 8 and the holder 10.

As illustrated in FIG. 3, to the holder 10 is detachably attached a fuel cartridge 13. The fuel cartridge 13 is an example of a constituent element of the cell, and filled with, for example, high-concentration methanol as a fuel to generate electricity. The fuel cartridge 13 is of a hollow box-like shape, and provided with a fuel supply opening 14 on a surface thereof (see FIG. 4). When the fuel cartridge 13 becomes empty, it is removed from the holder 10, and replaced with a new one. In other words, the fuel cartridge 13 is replaceably supported by the holder 10.

The fuel cartridge 13 is covered with a cap 15. The cap 15 extends continuously from the top cover 7, and is detachably supported by the holder 10. The holder 10 and the cap 15 define, in combination, a hollow open space 16. The open space 16 is an example of a user accessible section that basically allows free access to the user. The open space 16 is separated from the closed space 8 by the partition wall 11d. The fuel cartridge 13 is housed in the open space 16.

When the fuel cartridge 13 is replaced, the cap 15 is removed from the holder 10. While the cap 15 is removed, the fuel cartridge 13, the holder 10, etc. are exposed outside the main body 3.

As illustrated in FIG. 3, in the closed space 8 of the main body 3 are housed a mixing tank 20, a DMFC stack 21, a first condenser 22, and a second condenser 23.

The mixing tank 20 is used to dilute high-concentration methanol to an aqueous methanol solution with a concentration of a few to a few dozen %. The mixing tank 20 is supported by the base 6, and is adjacent to the fuel cartridge 13 with the partition wall 11d between them. The mixing tank 20 is connected through a fuel pump 25 to the fuel cartridge 13. The fuel pump 25 supplies high-concentration methanol from the fuel cartridge 13 to the mixing tank 20.

The DMFC stack 21 functions as an electricity generator, and is an example of a fuel cell that converts energy from the chemical reaction of methanol into electricity. The DMFC stack 21 comprises a fuel electrode (anode), an air electrode (cathode), and an electrolyte membrane placed between the electrodes. The DMFC stack 21 is supported by the base 6, and is located in the central portion of the main body 3 in the longitudinal direction thereof.

The fuel electrode (anode) of the DMFC stack 21 is connected through a solution supply pump 31 (see FIG. 4) to the mixing tank 20. The solution supply pump 31 supplies methanol solution from the mixing tank 20 to the fuel electrode (anode) of the DMFC stack 21.

One end of the fuel electrode (anode) of the DMFC stack 21 is connected via a fuel return tube (not shown) to the mixing tank 20. Through the fuel return tube, unreacted methanol solution discharged from the fuel electrode (anode) of the DMFC stack 21, and carbon dioxide generated by the oxidizing reaction in the fuel electrode (anode) are returned to the mixing tank 20. The unreacted methanol solution and the carbon dioxide are examples of waste substances discharged from the fuel electrode (anode). Immediately after being discharged from the fuel electrode (anode), the methanol solution has a temperature of 60° C. or above affected by heat generated during the electricity generation of the DMFC stack 21.

The first condenser 22 is located at a position in the fuel return tube. The first condenser 22 cools the methanol solution returned from the fuel electrode (anode) to the mixing tank 20. The first condenser 22 comprises a tube 33 through which the methanol solution flows, and a plurality of radiation fins 34 thermally connected to the tube 33.

On the other hand, the other end of the fuel electrode (anode) of the DMFC stack 21 is connected to an air supply tube 35. The air supply tube 35 is housed in the closed space 8, and extends linearly from the DMFC stack 21 to the partition wall 11d of the holder 10.

Figure 4:
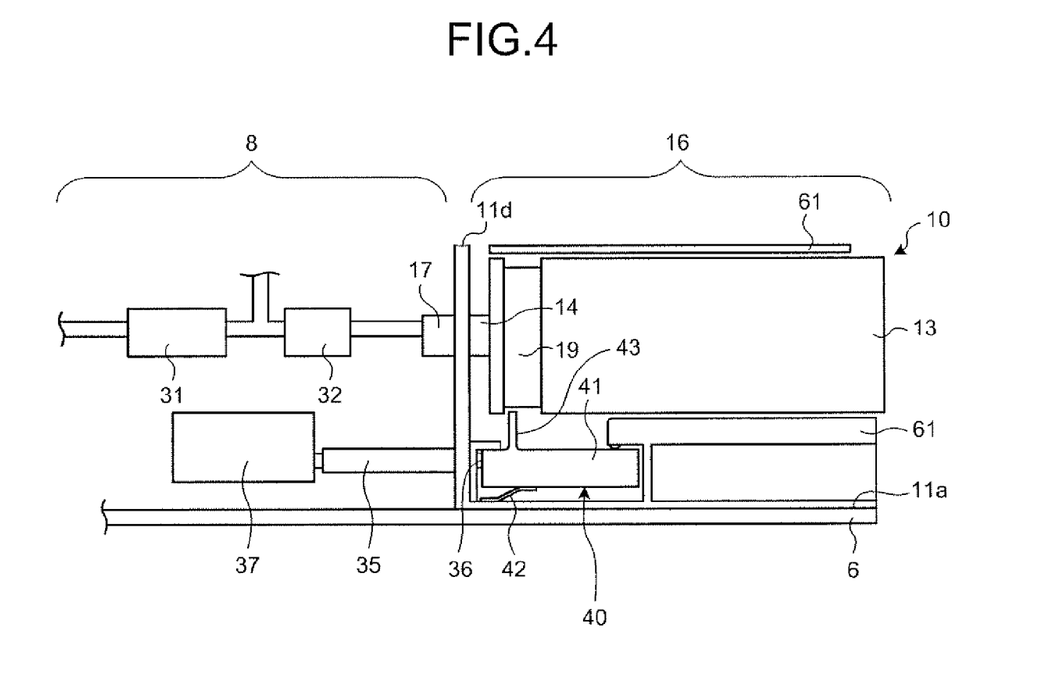
FIG. 4 is an exemplary side view of a fuel cartridge attached to a holder in the embodiment.

The partition wail 11d is provided with an air inlet 36 (see FIG. 4). The air inlet 36 draws in air from the atmosphere to supply it for electricity generation. The air inlet 36 is open to the open space 16, and is connected to the air supply tube 35 extending from the DMFC stack 21. The top cover 7 of the main body 3 is provided with a plurality of ventilation holes 7a at a position corresponding to the air inlet 36.

The air supply tube 35 is provided with an air pump 37. The air pump 37 supplies air drawn in through the air inlet 36 to the air electrode (cathode) of the DMFC stack 21. The air pump 37 is located between the DMFC stack 21 and the air inlet 36.

One end of the air electrode (cathode) of the DMFC stack 21 is connected to the second condenser 23. The second condenser 23 cools substances such as vapor and water discharged from the air electrode (cathode). The second condenser 23 is provided with a collection tank (not shown) for collecting water condensed from the vapor and the water discharged from the air electrode (cathode). The gas after removal of the water by the second condenser 23 is vented to the atmosphere.

The second condenser 23 is also connected to the mixing tank 20, and cools the carbon dioxide returned to the mixing tank 20. The carbon dioxide sent to the second condenser 23 is vented to the atmosphere therefrom.

As illustrated in FIG. 3, the first condenser 22 and the second condenser 23 are located at the end of the main body 3 opposite where the fuel cartridge 13 is located with the mixing tank 20, the DMFC stack 21, etc. between them. The first condenser 22 and the second condenser 23 are supported by the base 6 such that they are spaced apart and face each other. In between the first condenser 22 and the second condenser 23 are arranged a first fan 50 and a second fan 51.

That is, in the first embodiment, the fuel cartridge 13, the mixing tank 20, the air pump 37, the DMFC stack 21, the first condenser 22, and the second condenser 23 are aligned along the longitudinal direction of the main body 3.

The first fan 50 is adjacent to the first condenser 22. When the first fan 50 is in operation, cooling air flows through the first condenser 22 toward the first fan 50 and cools the first condenser 22. The cooling air that has cooled the first condenser 22 is discharged from an outlet of the first fan 50.

Meanwhile, the second fan 51 is adjacent to the second condenser 23. When the second fan 51 is in operation, cooling air flows through the second condenser 23 toward the second fan 51 and cools the second condenser 23. The cooling air that has cooled the second condenser 23 is discharged from an outlet of the second fan 51. Besides, impurities such as carbon dioxide discharged from the second condenser 23 are also discharged from the outlet of the second fan 51 by the flow of the cooling air.

The outlets of the first fan 50 and the second fan 51 are open in the direction of the other end of the main body 3. The main body 3 is provided with an exhaust vent 52 at the other end. The exhaust vent 52 is formed in the top cover 7 of the main body 3, and is opposite the outlets of the first fan 50 and the second fan 51. With this configuration, the cooling air and impurities such as carbon dioxide discharged from the outlets of the first fan 50 and the second fan 51 are discharged outside through the exhaust vent 52.

The exhaust vent 52 is open in the direction opposite the direction in which the air inlet 36 opens. In other words, at a position separated from the exhaust vent 52 in the longitudinal direction of the main body 3, the air inlet 36 that draws in air for electricity generation is open in a different direction from that in which the exhaust vent 52 opens. Accordingly, if the gas necessary for electricity generation is discharged from the exhaust vent 52 that contains a high level of oxygen and impurities such as carbon dioxide, it is less likely that the air inlet 36 draws in the gas discharged from the exhaust vent 52.

Described below is how the fuel cartridge 13 is attached to/detached from the holder 10. FIG. 4 is a side view of the fuel cartridge 13 attached to the holder 10. As illustrated in FIG. 4, the holder 10 is provided with a guide 61 for guiding the fuel cartridge 13 in the attachment/detachment directions. The fuel cartridge 13 is inserted into the holder 10 along the guide 61. In the partition wall 11d of the holder 10 is provided with a cartridge connection opening 17 that is exposed to the open space 16. When the fuel cartridge 13 is inserted in the holder 10 along the guide 61, the fuel supply opening 14 of the fuel cartridge 13 is connected to the cartridge connection opening 17. With this, high-concentration methanol is drawn out of the fuel cartridge 13 by a pump 32 to an anode flow path, and is sent to the DMFC stack 21 by the solution supply pump 31.

As illustrated in FIG. 4, below the fuel cartridge 13 attached to the holder 10 is provided an air intake duct 40 that communicates with the ventilation holes 7a of the top cover 7 of the main body 3. The air intake duct 40 is located at a position corresponding to the air inlet 36, and positions an air intake filter 41 with respect to the air inlet 36. The air intake filter 41 is of a substantially rectangular parallelepiped shape and has a predetermined thickness. The air intake filter 41 has a function of absorbing or eliminating, for example, hydrocarbon compounds in the atmosphere. The air intake filter 41 is detachably fitted in the holder 10 from the direction in which the fuel cartridge 13 is inserted into the holder 10. Thus, an end portion of the air intake filter 41 covers over the air inlet 36 so that the air inlet 36 is not exposed to the open space 16. The air intake filter 41 is aligned with the air supply tube 35. In addition, the air intake filter 41 is arranged such that it maintains a linear positional relationship with the air pump 37. When the air pump 37 is driven, air in the air intake duct 40 is drawn from the air inlet 36 via the air intake filter 41, and is sent to the DMFC stack 21.

Below the air intake filter 41 is provided a plate spring 42 as a biasing member. The air intake filter 41 is biased toward the fuel cartridge 13 by the action of the plate spring 42.

A groove-like recess 19 is formed in a part of the outer circumference of the fuel cartridge 13. The air intake filter 41 is provided with a projection 43 at a position corresponding to the recess 19 of the fuel cartridge 13 attached to the holder 10. The projection 43 of the air intake filter 41 overlaps the recess 19 of the fuel cartridge 13 by a length indicated by A in FIG. 5.

Figure 6A:
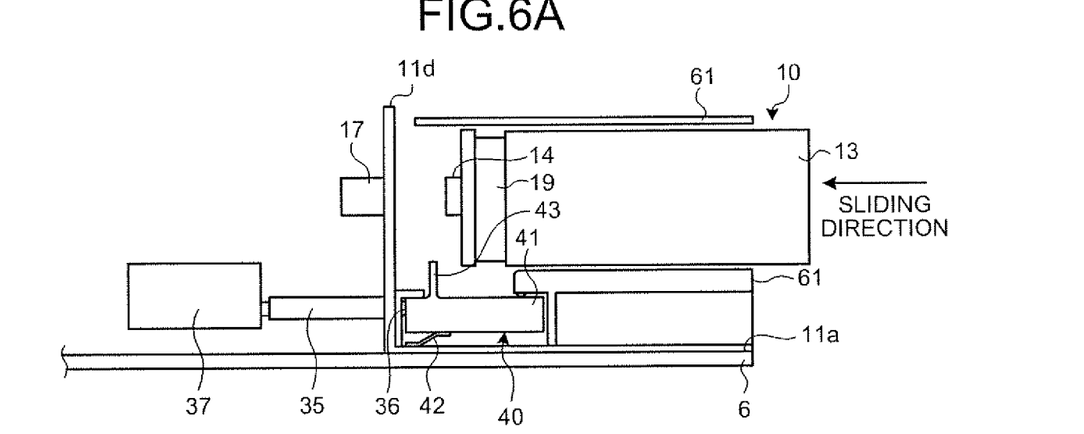
FIGS. 6A to 6C are exemplary side views illustrating how the fuel cartridge is attached to/detached from the holder in the embodiment.
Figure 6B:
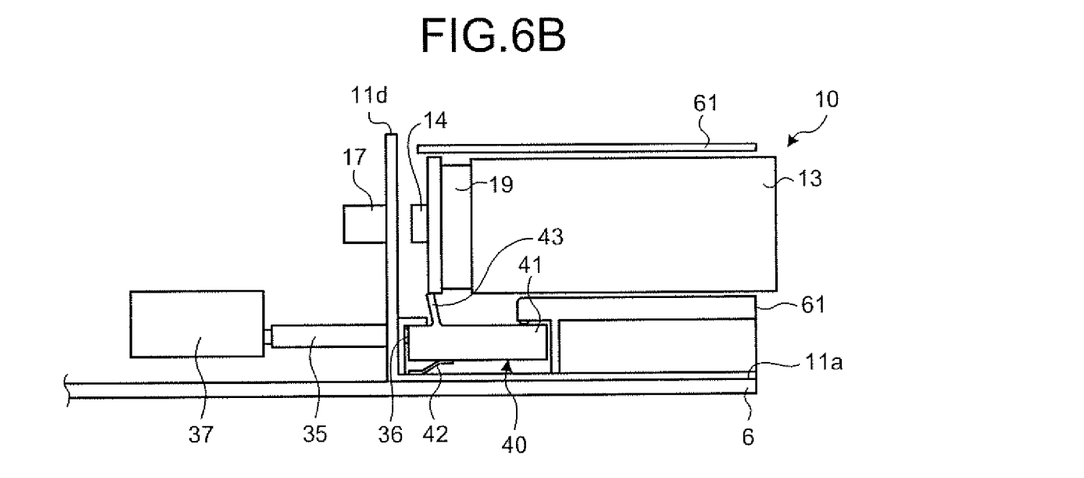
Figure 6C:
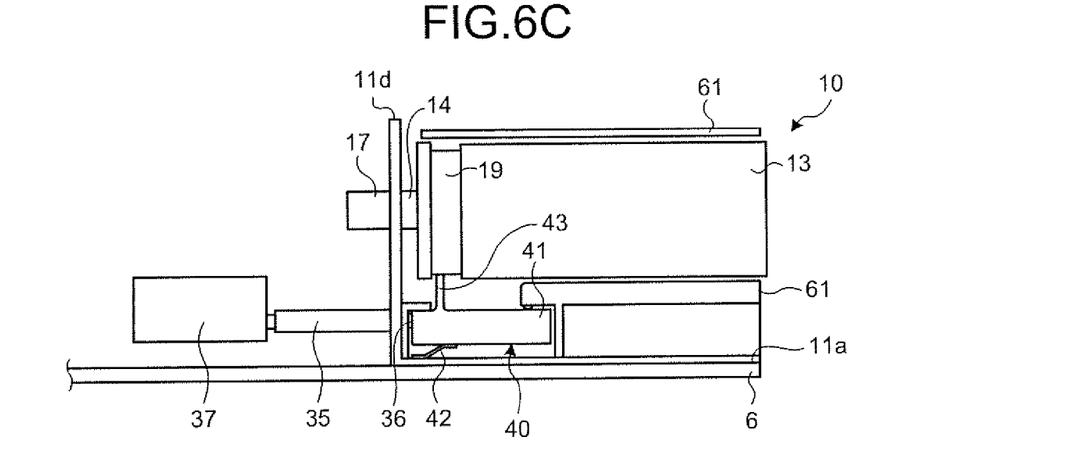

With reference to FIGS. 6A to 6C, a detailed description will be given of how the fuel cartridge 13 is attached to/detached from the holder 10. As illustrated in FIG. 6A, the fuel cartridge 13 is inserted into the holder 10 along the guide 61 from the outside of the main body 3 with the cap 15 removed therefrom. When the fuel cartridge 13 is inserted by a predetermined length, as illustrated in FIG. 6B, the projection 43 of the air intake filter 41 is brought into contact with the outer circumference of the fuel cartridge 13. As a result, the air intake filter 41 is pushed in the opposite direction of the fuel cartridge 13 by the length A that overlaps the recess 19 of the fuel cartridge 13. When the fuel cartridge 13 is further inserted from the state illustrated in FIG. 6B, as illustrated in FIG. 6C, the projection 43 of the air intake filter 41 is fitted into the recess 19 of the fuel cartridge 13. This releases the force that pushes the air intake filter 41 in the opposite direction of the fuel cartridge 13, and the air intake filter 41 is biased toward the fuel cartridge 13 by the plate spring 42. At this time, the air intake filter 41 vibrates, which removes dust and the like, if any, from the air intake filter 41, and the dust drops downward in the air intake duct 40. If the air intake filter 41 contains air purifiers such as activated carbon, the vibration agitates the air purifiers.

On the other hand, in the process of detaching the fuel cartridge 13 from the holder 10, when the fuel cartridge 13 is pulled out along the guide 61 by a predetermined length, as illustrated in FIG. 6B, the projection 43 of the air intake filter 41 is brought into contact with the outer circumference of the fuel cartridge 13. As a result, the air intake filter 41 is pushed in the opposite direction of the fuel cartridge 13 by the length A that overlaps the recess 19 of the fuel cartridge 13. When the fuel cartridge 13 is further pulled out from the state illustrated in FIG. 6B, as illustrated in FIG. 6A, the projection 43 of the air intake filter 41 is released from the fuel cartridge 13. This releases the force that pushes the air intake filter 41 in the opposite direction of the fuel cartridge 13, and the air intake filter 41 is biased toward the fuel cartridge 13 by the plate spring 42. At this time, the air intake filter 41 vibrates, which removes dust and the like, if any, from the air intake filter 41, and the dust drops downward in the air intake duct 40. If the air intake filter 41 contains air purifiers such as activated carbon, the vibration agitates the air purifiers.

That is, the fuel cartridge 13 and the projection 43 of the air intake filter 41 constitute a vibration applying mechanism.

By providing an openable/closable collection opening to the air intake duct 40, the dust, etc. that has dropped in the air intake duct 40 due to the vibration of the air intake filter 41 can be collected through the collection opening.

Figure 7:
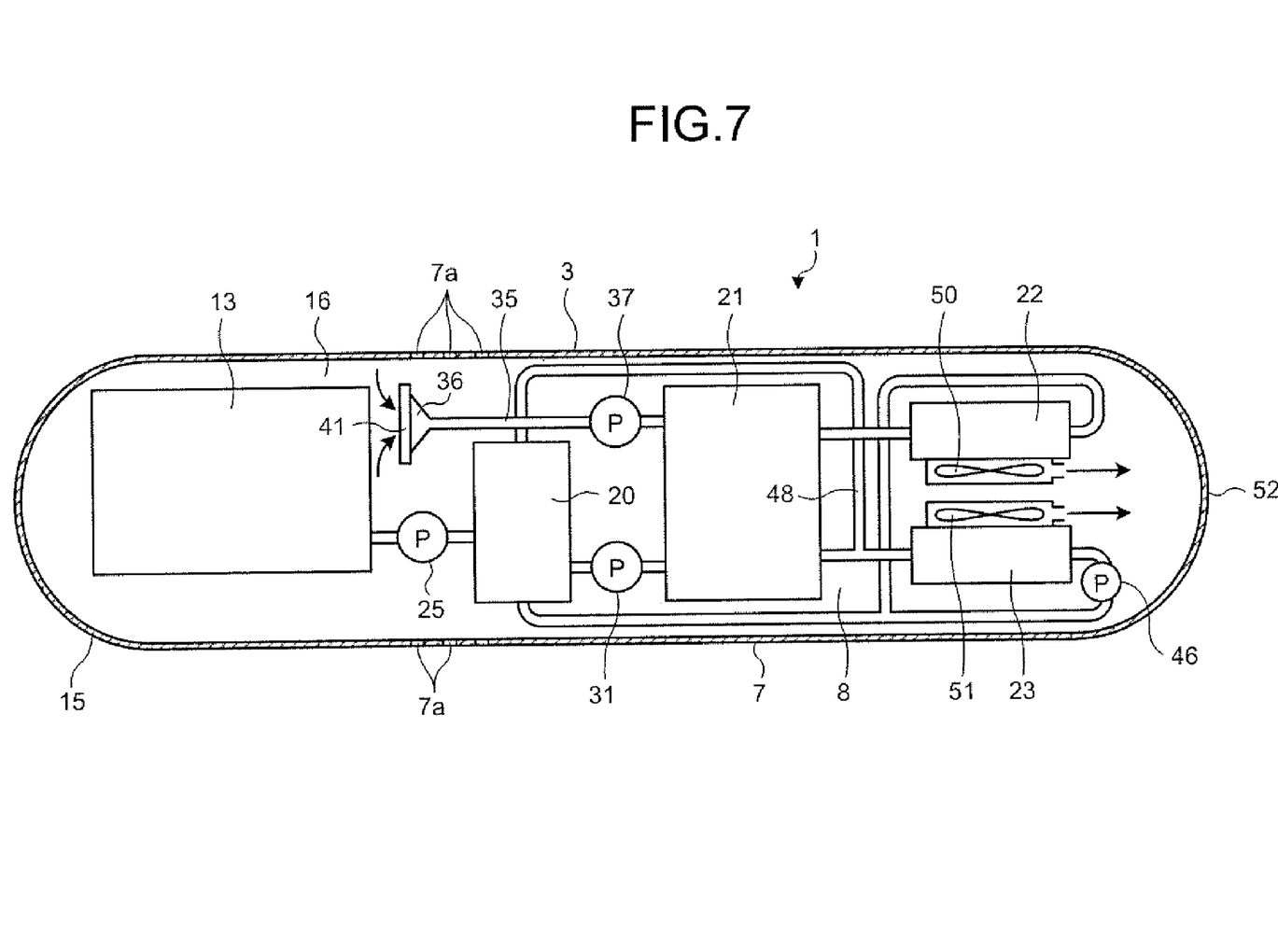
FIG. 7 is an exemplary schematic diagram of the fuel cell device for illustrating electricity generation thereof in the embodiment.

With reference to FIG. 7, a description will be given of electricity generation of the fuel cell device 1. FIG. 7 is a schematic diagram for explaining electricity generation of the fuel cell device 1.

The high-concentration methanol contained in the fuel cartridge 13 is sent to the mixing tank 20 by the fuel pump 25. To the mixing tank 20 are returned water collected from the air electrode (cathode) of the DMFC stack 21, and unreacted low-concentration methanol discharged from the fuel electrode (anode) of the DMFC stack 21. Accordingly, the high-concentration methanol is mixed with the water and the low-concentration methanol, and thus is diluted in the mixing tank 20. As a result, an aqueous methanol solution having a predetermined concentration is generated.

The methanol solution generated in the mixing tank 20 is sent to the fuel electrode (anode) of the DMFC stack 21. The methanol solution reacts with water and is oxidized on the fuel electrode (anode), which generates hydrogen ions, carbon dioxide, and electrons. The hydrogen ions pass through the electrolyte membrane of the DMFC stack 21, and reach the air electrode (cathode).

The carbon dioxide generated at the fuel electrode (anode) is sent to the first condenser 22 together with unreacted methanol solution. After being cooled by cooling air blown from the first fan 50, the carbon dioxide is sent to the mixing tank 20. The carbon dioxide evaporates in the mixing tank 20, and flows into the second condenser 23.

When the air pump 37 is driven, air for use in electricity generation is drawn in through the air inlet 36 via the air intake filter 41, and sent to the DMFC stack 21. At this time, the air intake filter 41 removes dust in the air as well as absorbing hydrocarbon compounds in the air.

The air cleaned by the air intake filter 41 is sent to the air electrode (cathode) of the DMFC stack 21 through the air pump 37. On the air electrode (cathode), oxygen in the air combines with the hydrogen ions and the electrons, and thus is reduced, which generates vapor. At this time, current flows through an external circuit connected between the fuel electrode (anode) and the air electrode (cathode), and electricity is generated.

The vapor generated at the air electrode (cathode) flows together with the carbon dioxide from the mixing tank 20 to the second condenser 23. The vapor is cooled by cooling air blown from the second fan 51 and condensed back into water in the second condenser 23. The water is temporary stored in the collection tank. The gas remaining after removal of the water and containing impurities such as carbon dioxide is discharged from the second condenser 23, and is also discharged from the outlet of the second fan 51 together with cooling air that has passed through the second condenser 23 toward the exhaust vent 52.

The water stored in the collection tank is sent to the mixing tank 20 through a collection pump 46, and reused to dilute high-concentration methanol.

With the fuel cell device 1, air for electricity generation is cleaned by the air intake filter 41, and is drawn into the air inlet 36. This enables removal from the air of dust and hydrocarbon compounds that are an obstacle to the reduction reaction on the air electrode (cathode) at the upstream of the DMFC stack 21. Thus, the electricity generation performance of the fuel cell device 1 can be maintained.

The air intake filter 41 is gradually impaired as the operation time of the fuel cell device 1 elapses, and its cleaning performance decreases. Therefore, frequent maintenance of the air intake filter 41 is required to maintain the cleaning performance for air used in electricity generation so that the fuel cell device 1 can maintain its electricity generation performance.

As described above, according to the first embodiment, a vibration applying mechanism is provided to vibrate the air intake filter 41 that cleans air to be supplied to the DMFC stack 21 in response to attachment/detachment of the fuel cartridge 13, which supplies fuel for electricity generation to the DMFC stack 21, to/from the main body 3. During the regular replacement of the fuel cartridge 13, the air intake filter 41 vibrates due to attachment/detachment of the fuel cartridge 13. With this, dust (for example, hydrocarbon compounds) can be periodically removed from the air intake filter 41 with the vibration. Therefore, it is possible to suppress the performance degradation due to a reduction in the amount of air flow, which increases the service life of the air intake filter 41, resulting in lower running cost. Moreover, during the regular replacement of the fuel cartridge 13, the vibration of the air intake filter 41 due to attachment/detachment of the fuel cartridge 13 agitates air purifiers, such as activated carbon, in the air intake filter 41. Thus, degradation of the air purifiers can be suppressed, which prevents the electricity generation performance of the fuel cell device 1 from degrading and achieves high power output for a long time.

In the first embodiment, the air intake filter 41 is described as being provided with the one projection 43 by way of example and without restrictive intent. The air intake filter 41 may be provided with a plurality of such projections. With a plurality of projections, the air intake filter 41 vibrates more, which enhances removal of dust and agitation of air purifiers.

Besides, in this configuration, the air intake filter 41, the air inlet 36r and the air pump 37 are aligned along the direction of the flow of air for electricity generation from upstream to downstream. This minimizes pressure loss between the air intake filter 41 and the air pump 37, and thus improves the cleaning efficiency of the air intake filter 41.

In addition, resistance to the drawing of air can be reduced, which results in less load on the air pump 37, and therefore, the air pump 37 consumes less power.

Although, in the first embodiment, the fuel cartridge 13 is described as being attached to/detached from the holder 10 sliding along the guide 61 in sliding directions as indicated in FIG. 6A, this is by way of example only and not intended to be limiting. The fuel cartridge 13 may be attached/detached by rotating it, or may be attached/detached by moving it in conjunction with the air intake filter 41.

Further, while the fuel cartridge is cited above as an example of an electricity generating element and attached to the holder, other elements may be added.

Still further, the fuel cell device of the first embodiment may be applied, as a power source, not only to a portable computer but also to other electronic devices such as a portable information terminal.

Figure 8A:
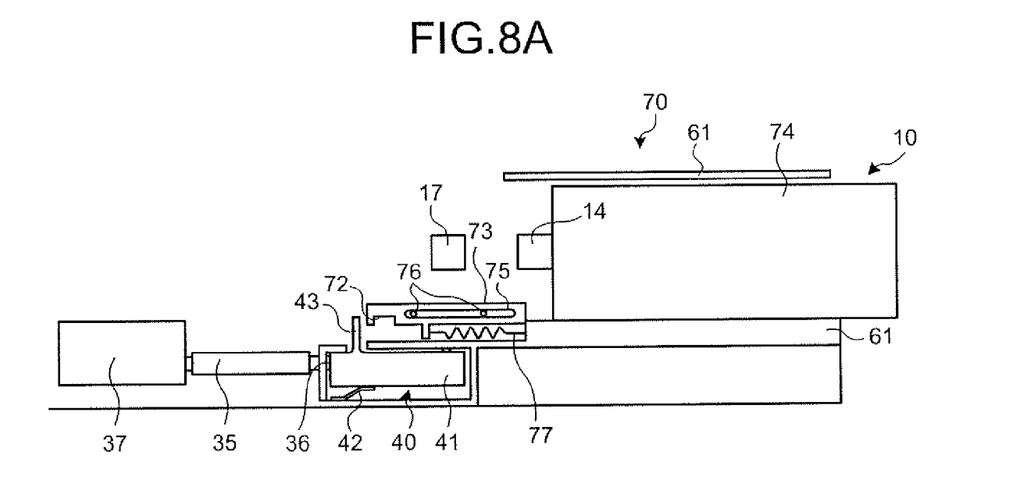
FIGS. 8A to 8C are exemplary side views of a fuel cell device according to a second embodiment of the invention.
Figure 8B:
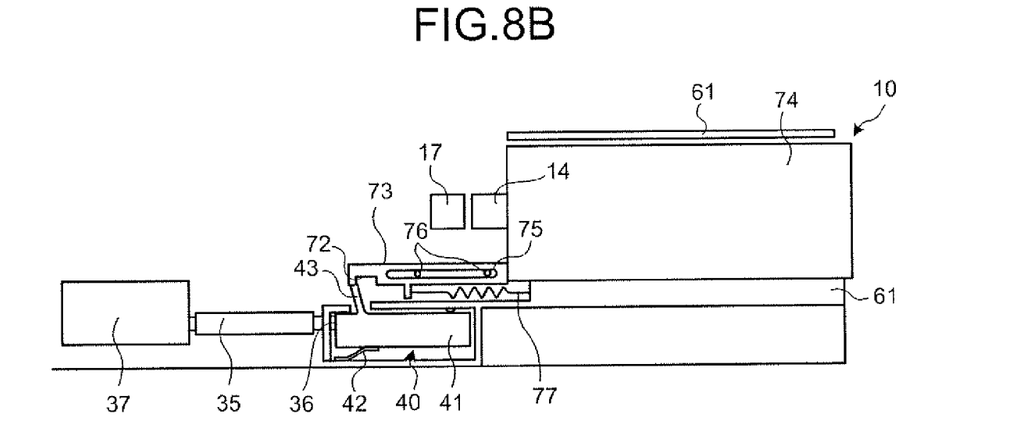
Figure 8C:
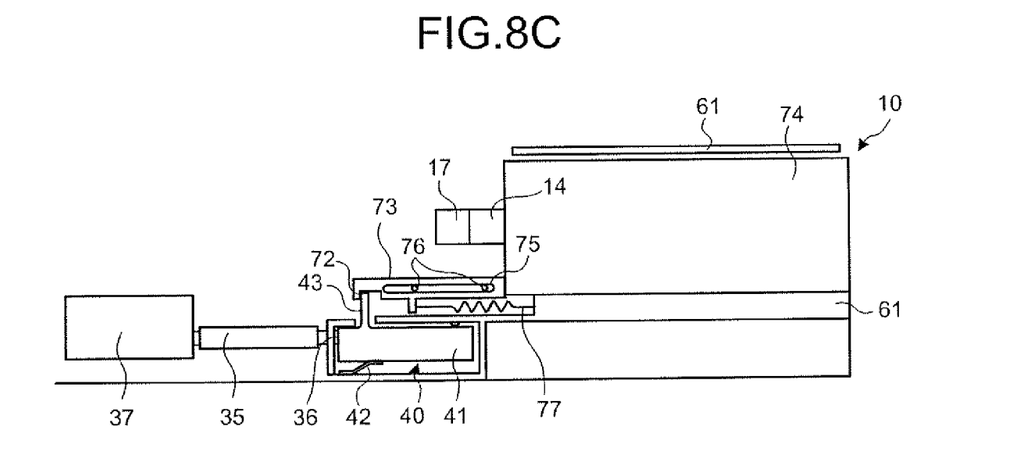

With reference to FIGS. 8A to 8C, a description will be given of a second embodiment of the invention. The same or like parts as described in the first embodiment are identified by the same reference numerals, and their description will not be repeated.

In the first embodiment, the groove-like recess 19 is formed in a part of the outer circumference of the fuel cartridge 13. Upon attachment/detachment of the fuel cartridge 13, the projection 43 of the air intake filter 41 is fitted into/released from the recess 19, which causes the air intake filter 41 to vibrate.

On the otter hand, in the second embodiment, a recess is not formed in the fuel cartridge itself, but a member having a recess is moved by the fuel cartridge to vibrate the air intake filter 41.

FIGS. 5A to 8C are side views of a fuel cell device 70 according to the second embodiment. As illustrated in FIGS. 8A to 8C, the fuel cell device 70 is of basically the same configuration as the fuel cell device 1 of the first embodiment except for the presence of a member 73 having a recess 72. More specifically, the fuel cell device 70 is provided with, in place of the recess 19 of the fuel cartridge 13, the member 73 at a position where it is brought into contact with a fuel cartridge 74 being inserted into the holder 10. The recess 72 is formed at a position on the member 73 such that it is opposite the projection 43 of the air intake filter 41 when the fuel cartridge 74 is attached to the holder 10.

Figure 5:
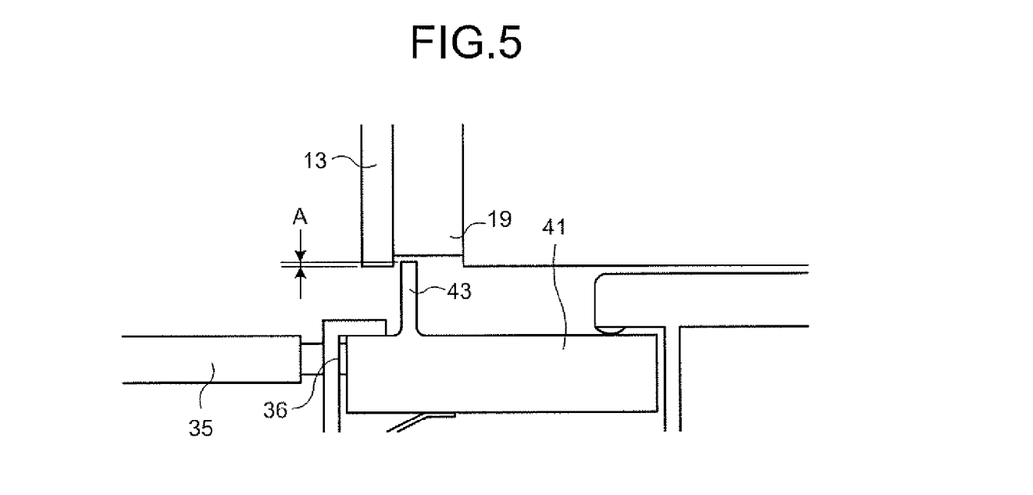
FIG. 5 is an exemplary side view of an air intake filter and the fuel cartridge for illustrating a relationship between a projection and a recess provided to them, respectively, in the embodiment.

In the same manner as previously described for the first embodiment in connection with FIG. 5, the projection 43 of the air intake filter 41 overlaps the recess 72 of the member 73 by the length A.

The member 73 having the recess 72 is provided with an elongated hole 75 that extends along the sliding directions of the fuel cartridge 74 being attached/detached. The elongated hole 75 engages a plurality of guides 76 arranged along the sliding directions on the side walls 11b and 11c to allow the movement of the member 73 along the guides 76. The member 73 is biased by a spring 77 toward the direction from which the fuel cartridge 74 is inserted.

Described below is how the fuel cartridge 74 is inserted into the holder 10. As illustrated in FIG. 8A, the fuel cartridge 74 is inserted into the holder 10 along the guide 61 from the outside of the main body 3 with the cap 15 removed therefrom. When the fuel cartridge 74 is inserted by a predetermined length, as illustrated in FIG. 8B, the fuel cartridge 74 is brought into contact with the member 73. As the fuel cartridge 74 is further inserted into the holder 10, the member 73 is pushed by the fuel cartridge 74 against the biasing force of the spring 77. Accordingly, the projection 43 of the air intake filter 41 is brought into contact with the outer surface of the member 73. As a result, the air intake filter 41 is pushed in the opposite direction of the fuel cartridge 74 by the length A that overlaps the recess 72 of the member 73. When the fuel cartridge 74 is further inserted from the state illustrated in FIG. 8B, as illustrated in FIG. 8C, the projection 43 of the air intake filter 41 is fitted into the recess 72 of the member 73. This releases the force that pushes the air intake filter 41 in the opposite direction of the fuel cartridge 74, and the air intake filter 41 is biased toward the fuel cartridge 74 by the plate spring 42. At this time, the air intake filter 41 vibrates, which removes dust and the like, if any, from the air intake filter 41, and the dust drops downward in the air intake duct 40. If the air intake filter 41 contains air purifiers such as activated carbon, the vibration agitates the air purifiers.

That is, the fuel cartridge 74, the member 73, and the projection 43 of the air intake filter 41 constitute a vibration applying mechanism.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A fuel cell device comprising:
   a main body;
   an electricity generator housed in the main body, the electricity generator configured to generate electricity;
   a fuel cartridge configured to be detachably housed in the main body, and supply the electricity generator with fuel for electricity generation;
   an air inlet configured to draw air in from atmosphere to supply the electricity generator with the air;
   an air intake filter configured to cover the air inlet and clean air; and
   a vibration applying mechanism configured to cause the air intake filter to vibrate in response to movement of the fuel cartridge with respect to the main body, the vibration applying mechanism comprises:
      a member having a recess located at a position where the member is brought into contact with the fuel cartridge being inserted into the main body and biased toward a direction from which the fuel cartridge is inserted, and
      a projection provided to the air intake filter at a position corresponding to the recess when the fuel cartridge is housed in the main body, the projection having a length that overlaps the recess, the projection being configured to be fitted in the recess when the fuel cartridge is attached to the main body and released from the member when the fuel cartridge is detached from the main body to cause the air intake filter to vibrate.

2. The fuel cell device of claim 1, further comprising a biasing member configured to bias the projection toward the member.

* * * * *